United States Patent Office 3,352,761
Patented Nov. 14, 1967

3,352,761
FERMENTATION MEDIA FOR INDUSTRIAL FERMENTATIONS COMPRISING AMYLOPECTIN AS ESSENTIALLY THE SOLE CARBOHYDRATE SOURCE
William Moses, Haworth, N.J., assignor to S. B. Penick & Company, New York, N.Y., a corporation of Delaware
No Drawing. Filed June 12, 1964, Ser. No. 374,825
6 Claims. (Cl. 195—80)

This invention relates to industrial fermentations and more particularly to improved media suitable for the fermentation of antibiotics and other industrially valuable chemicals.

Antibiotics are economically prepared by the growth of selected antibiotic-elaborating microorganisms in media favorable for such growth. Each of these organisms elaborates specifiic antibiotics as a result of its metabolic processes. The antibiotics elaborated and the efficiency of the elaboration process are a function of the particular strain of the organism and the media in which it is grown. This growth and elaboration process is essentially a fermentation reaction.

For a given fermentation, organisms of specific species and selected strains from these species, chosen for their abilities to elaborate the desired chemicals in reasonable yields, are propagated in fermentation media containing sources of carbon, nitrogen (protein and inorganic) and salts. The carbon sources are primarily carbohydrates. Fats may be added as adjuvant carbon sources. Often special starting materials are added such as growth-promoting auxins.

Fermentations may also be conducted wherein special starting materials are added to a fermentation medium in order to be modified by the organism during the fermentation. The organism, as a result of its inherent metabolism, either utilizes the added material or elaborates some specific enzyme which modifies the added material in order to present it in a new and modified form. An example of such a fermentation is the modification of cortisone to prednisolone in a fermentation medium in which certain Streptomyces species are propagated.

In general, the propagation of the organism and the elaboration of the desired products are affected by the concentration of carbohydrate in the medium. However, the efficient sources of carbohydrates, the polysaccharides when used in large amounts, tend to form viscous mixtures. Such mixtures, which are hydrated gels, due to their high viscosity render difficult, if not impossible, the proper techniques required for efficient industrial fermentation. They are difficult to sterilize, agitate and aerate. In addition, the poor diffusibility of the elaboration products in this semisolid gel causes these products to localize in the vicinity of the elaborating organism. The localized concentration of the elaboration products exceeds concentrations which will inhibit the propagation of the organism and, within a short time, the fermentation ceases with but poor yields of the elaboration products.

It is an object of this invention to provide novel fermentation media for industrial fermentations. It is another object of this invention to provide novel fermentation media that are relatively non-viscous despite high concentrations of polysaccharide carbohydrates. It is another object of this invention to provide media containing carbohydrates in a form that is readily assimilable by the microorganisms performing the fermentation.

This invention is based on the discovery that media containing amylopectin as a sole source of carbohydrate for the fermentation can be formulated in high carbohydrate concentrations, that such media are relatively fluid and that when utilized they provide industrially important fermentation products in unexpectedly high yields. These media, with the exception of the aforementioned amylopectin as the carbohydrate source are the conventional media used for fermentation; consisting of nitrogen sources from protein and non-protein materials; inorganic salts; buffers and, if desired for the reaction, special additives to be converted or to promote growth.

Amylopectin, when referred to with respect to this invention is the branched-chain d-glucopyranose polymer present in starches. This is in contrast to amylose, the straight chain d-glucopyranose polymer. Amylopectin may be derived from a starch in which it is a principle component such as amioca, the starch from waxy maize, or it may be fractionated from other commercial starches such as corn, wheat or potato starch of which it is a component. U.S. Patents 2,829,987–990 describe such a fractionation process. In amylopectin, the d-glucopyranose units are joined by 1-4, alpha linkages with branches occurring randomly at the 6-carbon position. The polymer usually has a molecular weight of over one million. Amylopectin is soluble in cold water and its solutions are fluid even at concentrations as high as 20% by weight. Whether derived by fractionation or from waxy maize, amylopectin solutions are clear and non-gelling. Due to the high molecular weight of the polymer, it has good film-forming properties.

Nitrogen sources for the purposes of this invention may be derived from protein or non-protein sources. Nitrogen sources for fermentation are primarily protein materials but it is often advantageous to additionally add inorganic nitrogen and non-protein nitrogen. Sources of protein useful for the fermentation media may be zein; gluten; soya protein; crude protein extracts from cotton seed; soybean flour; soya peptone; brewer's yeast; casein; protein hydrolyzates (acid or enzyme); fish flours; distiller's solubles; corn steep liquor; egg peptone; tankage. Non-protein nitrogen from organic sources may be furnished by urea and its salts. Nitrogen from inorganic sources such as ammonium salts and nitrate salts may also be used. The amount of nitrogen from protein or other sources is not critical provided that a sufficient amount is provided for the metabolism of the organism and that any excess does not exceed toxic limits for the individual organism. This varies with the organism and with the various enzymes elaborated by the organism. The inorganic salts which are normally useful for fermentation media include the above mentioned ammonium and nitrate salts used as nitrogen sources and chloride, sulfates, phosphates and carbonates. The anions may be combined with various metal ions which are needed for microbial growth such as sodium, calcium, potassium, magnesium and the trace metals which serve as specific components of enzyme systems within the fermentation organism. These trace metals include cobalt, iron, zinc and molybdenum.

It is advantageous to add various buffering agents to the medium in order to insure favorable pH conditions or by-products which may inhibit the growth of the organism or the elaboration of the desired products do not accumulate during the course of the fermentation. Various combinations of salts of weak acids and strong alkalies or strong acids and weak cations may be used in order to buffer the medium in cases where the buffering is on the basis of the acidity or alkalinity of the medium is desired. In cases where the medium tends to become acidic as the fermentation proceeds and where such acidity may inhibit the growth of the organism, it is advantageous to add buffering salts such as calcium carbonate to the medium. Other buffers may also be used to maintain the proper pH during the fermentation. Precipitants may be added to remove undesirable metabolities. Enzymes may be added to assist the organism in the utilization of the medium.

The media of this invention, i.e. where the prime source of carbon is the carbohydrate amylopectin, have yielded unexpectedly high concentrations of industrially useful products. For example, when a medium containing 7% or more of amylopectin as the source of carbohydrate was used for the fermentation of neomycin by the organism *Streptomyces fradiae*, neomycin has been recovered in yields twice as high as those described in the prior art (see U.S. Patent 2,957,810, issued Oct. 25, 1960, wherein a concentration of neomycin in the range 6,000 units of neomycin base per milliliter of medium is achieved). The invention will be particularly described with respect to neomycin. However, the media of this invention may also be used in the practice of industrial fermentations where the ability of the medium to remain liquid in the presence of high concentrations of carbohydrates is a limiting factor in the initiation and course of the fermentation.

The use of amylopectin, since it forms stable, low viscosity solutions, eliminates the need for hydrolysis of the starch and/or such special modifying steps as dextrinization, saccharification. The relatively low viscosity of concentrated solutions of amylopectin as compared to starches, permits ease in preparation of the solution, rapid sterilization of the media, good heat transfer qualities during fermentation and sterilization and insures excellent sparging without excessive foaming.

Most of the prior art media contained 4 to 6 carbohydrates. The lower percentages of carbohydrates were utilized for media wherein the carbohydrates sources were of the easily assimilable type such as mono- and disaccharides. Starches and sugar mixtures permitted higher limits of carbohydrate content but no advantageous yields were noted for such higher concentrations and the concomitant difficulties of handling made such media uneconomical. Such prior art media, when used for example in the fermentation of neomycin according to the aforementioned patent, yielded potencies of about 6,000 micograms of base per milliliter of media (7,500 micrograms of neomycin as the sulfate per milliliter of media). Using a media similar to the one described in the prior art patent, but substituting 7% of amylopectin for the total carbohydrates of the reference, provided yields of neomycin of about 12,000 micrograms of base per milliliter. Further, because it is possible to handle higher concentrations of amylopectin in solution, media containing 9%, 11% and 13% of amylopectin have been prepared. Such media have provided neomycin broth potencies as high as 18,000 micrograms of base per milliliter.

The invention will be more particularly described in the examples below wherein the fermentation of neomycin is used as a representative industrial fermentation. However, neomycin fermentations are merely illustrative of the benefits of the novel medium of this invention which is also useful in the fermentation of other antibiotics (yields of polymyxin are doubled), the fermentation conversion of steroids and other complex chemicals and the fermentation production of industrial chemicals where the particular products yielded are dependent on the precursors and/or the organism being propagated rather than on the particular type of carbohydrate medium. Of course, where the product is the result of direct modification of the carbohydrate rather than metabolism thereof, choice of the specific carbohydrate precursor is then paramount.

Other antibiotics and fine chemicals are also obtained by industrial fermentations in media based on amylopectin or amioca as the sole carbohydrate source. Representative organisms and products elaborated by their fermentation in amylopectin-based media according to this invention are listed in Table I.

TABLE 1

| Organism: | Product |
|---|---|
| Penicillium chysogenum | Penicillin. |
| Aspergillus oryzae | Fungal amylase. |
| Bacillus subtilis | Bacterial amylase. |
| Bacillus diastaticus | Bacterial amylase. |
| Bacillus subtilis | Bacterial protease. |
| Aspergillus niger | Glucose oxidase. |
| Aspergillus phoenicius | Amyloglucosidase. |
| Streptomyces griseus | Nystatin. |
| Streptomyces rimosus | Tetracyclines. |
| Streptomyces venezuelae | Chloramphenicol (chloromycetin). |
| Clostridium acetobutylicum | Butanol-acetone. |
| Aspergillus niger | Citric acid. |
| Aspergillus oryzae | Kojic acid. |
| Rhizopus nigricans | Fumaric acid. |
| Lactobacillus leichmannii | $B_{12}$. |

It is to be noted that the presence of small amounts i.e. less than 3% of amylose is not detrimental to the media of this invention. Such small amounts may result from incomplete separation of amylopectin according to the present commercial processes or may be found in smaller amounts in amioca, the naturally occurring starch from waxy maize. Such small amount are within the scope of this invention.

It will be apparent from the examples that various equivalent changes and modifications dependent on the particular fermentation, may be resorted to in the practice of this invention in its broader or more specific aspects without departing from the scope and spirit of the invention. It will be further understood that such equivalent embodiments are within the purview of those skilled in the art.

*Example 1*

A nutrient medium having the following composition was prepared:

| | Percent |
|---|---|
| Soyaflour | 2 |
| Ammonium sulfate | 1 |
| Amylopectin | 7 |
| Cotton seed protein | 1 |
| Corn gluten | 1 |
| Calcium carbonate | 1 |

The medium was sterilized and inoculated with a neomycin-producing strain of *Streptomyces fradiae*. The broth potency was assayed periodically with the following results:

| Time in hours: | Broth potency *, mcgm. base/ml. |
|---|---|
| 120 | 8,500 |
| 144 | 10,100 |
| 168 | 12,000 |

*All neomycin assays were by the procedure described in USP XVI, pp. 868–964 (Cylinder Plate Method).

A parallel fermentation medium wherein the amylopectin was replaced with Cerelose achieved a maximum potency at 144 hours of 6,000 micrograms per milliliter.

Example 2

A medium prepared according to Example 1 but containing 9% of amylopectin was cultured as in Example 1 and gave the following broth potencies:

| Time in hours: | Broth potency, mcgm. base/ml. |
|---|---|
| 120 | 8,500 |
| 144 | 9,000 |
| 168 | 15,000 |

Example 3

A medium was prepared according to Example 1 but containing 11% of amylopectin was prepared an cultured in the manner described in Example 1. The assay results during fermentation were as follows:

| Time in hours: | Broth potency, mcgm. base/ml. |
|---|---|
| 120 | 9,000 |
| 144 | 9,500 |
| 168 | 16,000 |

Example 4

A medium prepared according to Example 1 but using amioca, the starch from waxy maize, assaying in excess of 95% amylopectin was substituted for the substantially pure amylopectin used in Examples 1, 2, and 3. The amioca was present to the extent of 9%. The fermentation was assayed and showed the following broth potencies:

| Time in hours: | Broth potency, mcgm. base/ml. |
|---|---|
| 144 | 12,950 |
| 168 | 17,000 |

Example 5

A medium was prepared according to Example 4 to which was added 0.2% of alpha amylase. It was found that the added enzyme had little or no effect on the rate of fermentation or the final yield of the neomycin.

I claim:

1. The method of producing neomycin in enhanced yield from the fermentation of a neomycin-producing Streptomyces species which comprises using a fermentation medium having amylopectin as substantially the sole source of carbohydrate, a nitrogen source and salts.

2. A method of producing neomycin according to claim 1, wherein the amylopectin is present in the fermentation medium in an amount of at least about 7% by weight.

3. In the method of producing neomycin from the fermentation of a neomycin producing Streptomyces species using a fermentation medium having a source of carbohydrate, a nitrogen source and salts, the improvement for producing said neomycin in enhanced yield which comprises employing amylopectin as essentially the sole source of carbohydrate.

4. A method of producing neomycin according to claim 1, wherein the neomycin-producing Streptomyces species is *Streptomyces fradiae*.

5. A method of producing neomycin according to claim 1, wherein the neomycin-producing Streptomyces species is *Streptomyces fradiae* and wherein the amylopectin is present in the fermentation medium in an amount of at least about 7% by weight.

6. A method of producing neomycin according to claim 1, wherein the amylopectin is present in the fermentation medium in an amount of from about 7% to 13% by weight.

References Cited

UNITED STATES PATENTS

| 2,596,971 | 5/1952 | Allen | 195—80 |
| 2,763,591 | 9/1956 | Hatch et al. | 195—80 |
| 2,957,810 | 10/1960 | Johnson et al. | 195—80 |

OTHER REFERENCES

Chemical Abstracts, vol. 28, 1934, p. 1740 (5).

Cook, A. H.: "The Chemistry and Biology of Yeasts," pp. 338–389, 1958, Academic Press.

Merick Index, 7th ed., Rahway, N.J., 1960, p. 62.

Pazur et al.: "J. Biol. Chem.," vol. 234, No. 8, August 1959, p. 1967.

Schock, T. J.: "J. A. C. S.," 1942, pp. 2957–2961.

A. LOUIS MONACELL, *Primary Examiner*.

D. M. STEPHENS, M. W. GREENSTEIN,
*Assistant Examiners*.